United States Patent [19]

Pazzaglia

[11] Patent Number: 4,571,476

[45] Date of Patent: Feb. 18, 1986

[54] DEVICE FOR POSITIONING METAL ENDS TO BE LAP WELDED ONE TO THE OTHER

[75] Inventor: Luigi Pazzaglia, Bologna, Italy

[73] Assignee: Cefin S.p.A., Bologna, Italy

[21] Appl. No.: 648,003

[22] Filed: Sep. 5, 1984

[30] Foreign Application Priority Data

Sep. 26, 1983 [IT] Italy ............................ 3567 A/83

[51] Int. Cl.⁴ ............................................. B23K 11/06
[52] U.S. Cl. ...................................... 219/61.3; 219/64
[58] Field of Search ............................... 219/64, 61.3

[56] References Cited

U.S. PATENT DOCUMENTS 4,354,090 10/1982 Nilsen ............................... 219/64 X Primary Examiner—C. L. Albritton
Assistant Examiner—Alfred S. Keve
Attorney, Agent, or Firm—Balogh, Osann, Kramer, Dvorak, Genova & Traub

[57] ABSTRACT

Described herein is an invention that belongs to the technical field of machines for effecting lap welding operations and relates, in particular, to a device for positioning the metal ends of strips destined, once the said ends are joined one to the other, to constitute can bodies.

Envisaged by the invention is a device in which the slots for housing the ends to be welded are defined by at least one pair of guide blocks that are substantially opposed and are shaped in the form of a step in such a way that each constitutes means of abutment for one of the said ends and supporting surfaces for both of the said ends. Advantageously, at least one block in the said at least one pair of blocks can be set with respect to the other.

4 Claims, 5 Drawing Figures

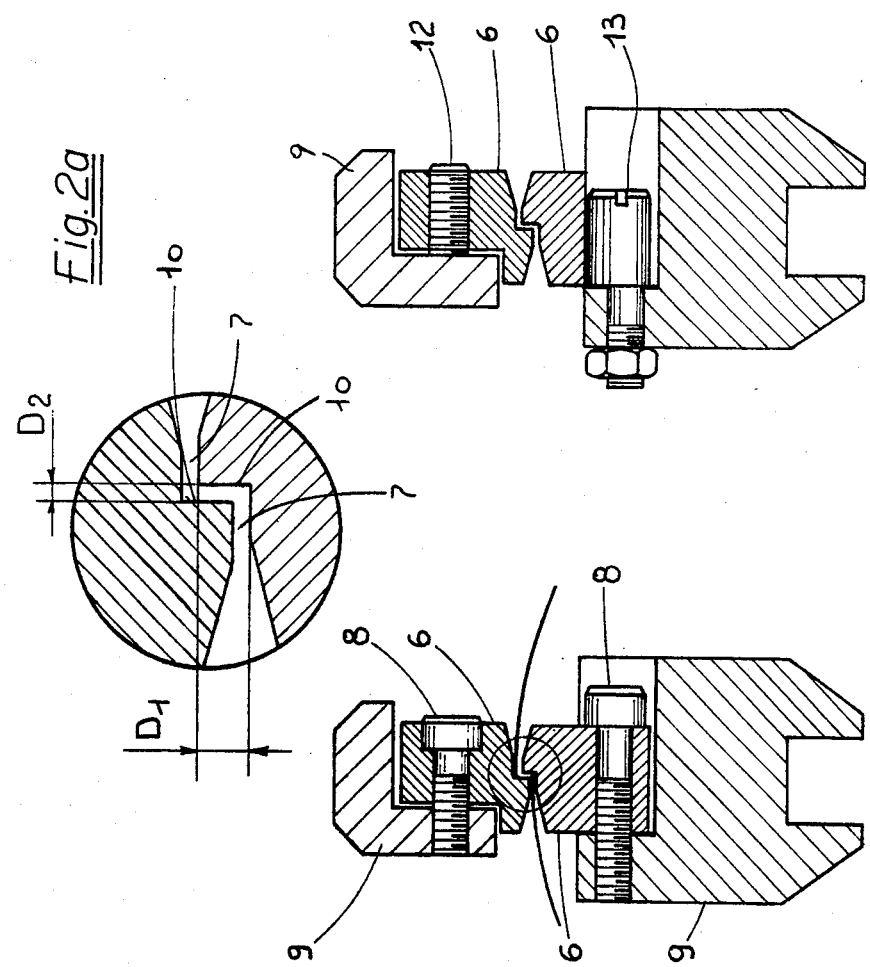

DEVICE FOR POSITIONING METAL ENDS TO BE LAP WELDED ONE TO THE OTHER

BACKGROUND OF THE INVENTION

The invention relates to a device for positioning metal ends to be lap welded one to the other.

DESCRIPTION OF THE PRIOR ART

As is known, the machines for effecting the lap welding of the ends of prior rounded metal strips that are destined to constitute the bodies of cans, drums, and similar containers, are provided with a device for positioning correctly the said ends. Seam welders have, for example, a device defined by a guide shaped in the form of a "Z", the slots of which receive the ends to be welded and, as the strips are carried along the said slots, gradually determine the overlap for the said ends.

Provision is generally made for numerous "Z" shaped guides placed in alignment one with the other, in such a way as to extend up to the welding station. These guides operate in cooperation with other means: for example gage checking devices which, at the welding station, encircle the body to be formed.

The position of the slots of the said guides determines both the extent of the overlap, one with respect to the other, of the ends to be welded and the precise centering of the welding with respect to the overlap. Qualitatively speaking, the guides in question are decisive in defining the satisfactory outome of the welding operation.

In practice, it has been seen for some time now that with the use of the said guides, numerous problems exist that adversely affect the operating costs and the versatility of the welding machines on which they are utilized. The said "Z" shaped guides are, in fact, difficult to make because the bottom of the slots therein is of a minimum cross section (for example, the width can be in the region of one millimeter) yet has to be completely minus any unevenness.

Furthermore, the said guides are fragile at the very point, namely between the two slots, where the gap between the two ends to be overlapped is extremely small. No modification can be made to the said gap since it is a welding exigency.

Also, it has been seen that wear in the bottom of the said slots alters the overlap value for the two ends right along the guide, with the consequent formation of cans and the like which, on account of the welding operation, are substantially imperfect.

Once set, the extent of the overlap between the two ends of a can to be formed cannot be modified. When the requirements undergo a variation, the only possible solution is to replace the "Z" shaped guide with another guide of a different cross section area.

SUMMARY OF THE INVENTION

The technical task forming the basis of the invention is, in view of what has been stated above, to devise a device for positioning metal ends to be lap welded one to the other with which it is possible to virtually overcome the aforementioned problems, so as to enable cans, drums, and similar containers to be formed in a precise, inexpensive and versatile way out of metal strips.

The requirements outlined above are substantially satisfied with the device according to the invention for positioning metal ends to be lap welded one to the other, comprising two slots for housing two of the said ends to be welded and for defining the position for the welding of the said ends, wherein the said slots are defined by at least one pair of guide blocks that are substantially opposed and are shaped in the form of a step in such a way that each constitutes means of abutment for one of the said ends and lower, or alternatively upper, supporting surfaces for both of the said ends.

Advantageously, at least one block in the said at least one pair of blocks can be set with respect to the other.

BRIEF DESCRIPTION OF THE DRAWINGS

Further characteristics and advantages will become more apparent from the description that follows of one preferred, though not sole, embodiment for the invention, illustrated purely as an unlimited example on the accompanying drawings, in which:

FIG. 2 is a cross section of FIG. 1 along the line II—II;

FIG. 2a is an enlarged view of a portion of FIG. 2;

FIG. 3 is a further sectional view of FIG. 1, in the region of the broken line III—III;

FIG. 4 is a partial cross section similar to those listed above, in the region of the line IV—IV in FIG. 1.

DESCRIPTION OF THE PREFERRED EMBODIMENT

Figure 1:
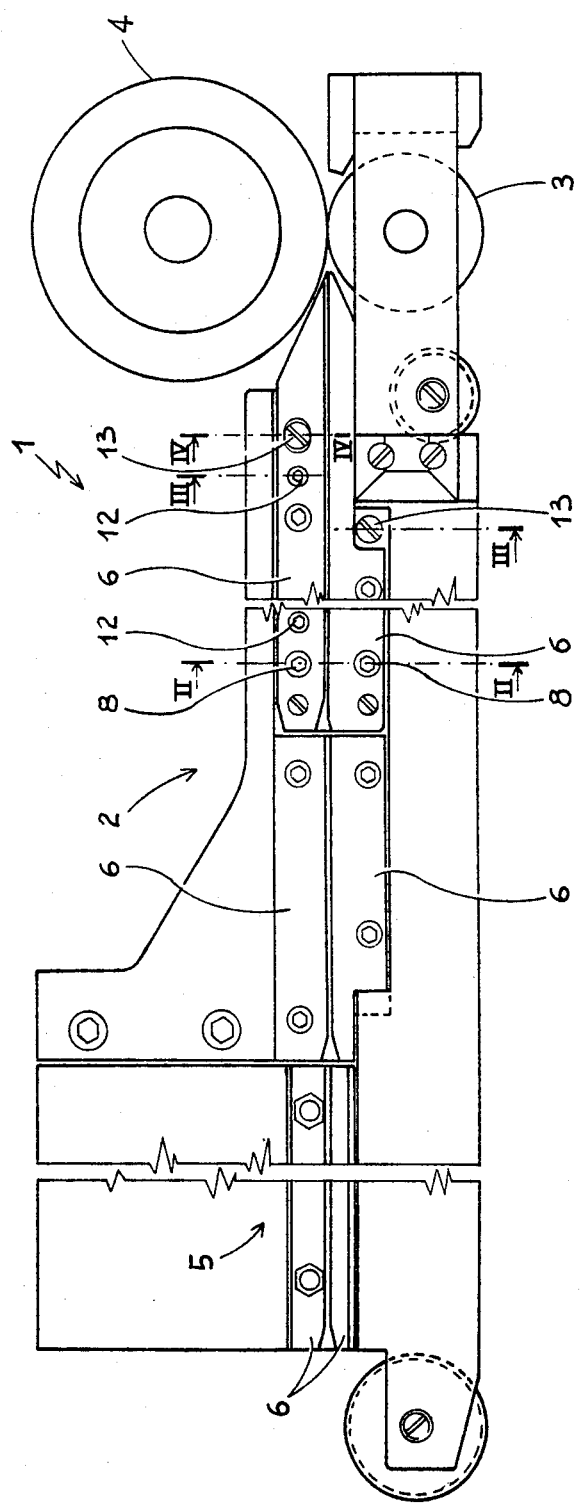
FIG. 1 shows, in a lateral view, one part of a welding machine on which the device according to the invention is mounted.

With reference to the said figures, the device according to the invention is fitted to a seam welder 1, one arm 2 of which can be seen in FIG. 1. The said arm 2 ends in the region of a pair of rollers 3 and 4, in between which the current required for welding circulates. The device itself, shown globally at 5, is virtually placed in alignment with the tangent common to the two rollers 3 and 4.

In particular, provision is made in the device 5 for three pairs of guide blocks 6, placed consecutively one with respect to the other. The first two pairs of guide blocks 6 are stationary, while the third pair, immediately adjacent to the rollers 3 and 4, are provided with blocks that can be set one with respect to the other.

On account of the transverse shape thereof, the said third pair of guide blocks 6 can be seen in FIGS. 2 to 4.

It is obvious from the above mentioned figures that each block 6 positioned in proximity of the rollers 3 and 4 is shaped in the form of a step, and that the two blocks in the pair are placed, one at the side of the other, in opposed positions, in such a way as to define slots 7 in which the ends of the strips to be welded are inserted.

FIG. 2 shows specifically that each block 6 is rendered integral, through screws 8, with a corresponding support 9 belonging to the arm 2. Furthermore, on account of the step shape thereof, each block 6 forms a stop and abutment means 10 for one end to be welded, and lower, or alternatively, upper supporting surfaces 11 for both of the ends to be welded. The supporting surfaces 11 extend in opposite directions, from the upper and lower extremities of the abutment means 10, and are partially curved so as to define slots 7 with a bevel to encourage the insertion therein of the strips.

The gap $D_1$ in between the blocks 6, in a direction parallel to the abutment means or walls 10, determines the spacing between the ends of the strips to be welded, while the gap $D_2$ in between the abutment means or walls 10, parallel one to the other, determines the extent of the overlap, one with respect to the other, of the said ends to be welded.

An original feature is that the said blocks 6 can be positioned, one with respect to the other, in such a way as to vary at will, within predetermined limits, both the extent of the overlap of the ends, one with respect to the other, of the strips to be welded, and the spacing there in between.

This technical characteristic is achieved with the means depicted in FIGS. 3 and 4 which, in practice, are defined by adjustable spacer screws 12 (FIG. 3) for setting the extent of the overlap of the said ends, and by eccentric connection elements 13 for regulating the spacing between the said ends. The adjustable spacer screws 12 act in opposition to the screws 8, while the eccentric connection elements 13, that vary the position in height of the blocks 6 to suit the angular position of these, are intended to be in substitution of the screws 8. In the specific case illustrated, only the upper block 6 is provided with adjustable spacer screws 12, while both of the blocks 6 adjacent to the rollers 3 and 4 are provided with eccentric connection elements 13.

The device according to the invention can, however, be so constructed as to have each pair of blocks 6 adjustable, and the relevant choice depends solely on the working requirements.

Once mounted, the blocks 6 form, one with respect to the other, the slots 7 inside which the ends of the strips to be welded are positioned with precision, eventually with the possibility of varying the extent of the overlap of the said ends, or the of the spacing there in between.

The setting of the blocks 6 necessitates a simple rotation to tighten or loosen the locking screws 8, the adjustable spacer screws 12 and the eccentric connection elements 13.

Thanks to this expedient, it is particularly easy to construct the device for positioning the said ends since the machining of narrow, precise, slots is no longer necessary. Furthermore, the blocks according to the invention are robust and thoroughly reliable, even when the slots 7 are very close to one another.

Finally, wear on the blocks does not influence either the dimensions or the finish of the cans to be formed by welding, and this is because the extent of the overlap, one with respect to the other, of the ends to be welded can be returned, through a simple adjustment, to the initial value. In the event of a variation in the product to be formed, the extent of the overlap, one with respect to the other, of the said ends can be modified, even to a considerable extent, without it being necessary to replace the blocks.

The invention, as envisaged in the foregoing text, is liable to undergo numerous modifications and variants, all of which falling within the conceptual framework thereof. For example, the means provided to effect the setting of the said blocks can be of any type.

Also, all parts may be substituted with others that are technically equivalent, while the materials used and the shapes and sizes thereof, may be any depending on the requirements.

What is claimed is:

1. Device for positioning metal edges which are to be lap welded one to the other, comprising two oppositely disposed slots for receiving said metal edges and bringing them together in overlapping relationship to be welded and for defining the position for the welding of the said metal edges, wherein the said slots are defined by at least one pair of guide blocks that are substantially opposed and are shaped in the form of a step in such a way that each guide block defines an abutment for one of the said metal edges and said guide blocks define therebetween opposed pairs of supporting surfaces for both of the said metal edges.

2. Device according to claim 1, wherein at least one of said guide blocks can be adjustably set by adjustable means with respect to the other guide block.

3. Device according to claim 2, wherein the said adjustable block can be set to approach transversely the block opposed thereto, in such a way as to vary the extent of the overlap, one with respect to the other, of the said metal edges to be welded, by means of various screws that pass through the said block to provide support for the said block.

4. Device according to claim 2, wherein the said adjustable block can be adjusted to widen the distance between itself and the block opposed thereto, in such a way as to vary the spacing between the said metal edges to be welded, by means of eccentric connection elements that terminate at a fixed support.

* * * * *